2,762,814
Patented Sept. 11, 1956

2,762,814

PRODUCTION OF VULCANIZATION ACCELERATORS

John Cooper Lunt, Ruabon, Wrexham, Wales, assignor to Monsanto Chemicals Limited, London, England, a British company No Drawing. Application November 26, 1954, Serial No. 471,528

Claims priority, application Great Britain November 27, 1953

1 Claim. (Cl. 260—306.6)

This invention relates to an improved process for the production of cyclohexyl benzthiazylsulphenamide.

Cyclohexyl benzthiazylsulphenamide (that is to say N - cyclohexyl 2 - benzthiazylsulphenamide) is a well known vulcanisation accelerator for rubber, and is for instance sold under the registered trademark "Santocure." It partly owes its success to the fact that it is a delayed action accelerator, and so enables a rubber stock containing it to be worked at processing temperatures without an undue measure of premature vulcanisation or "scorching" taking place, though vulcanisation is brought about rapidly when the temperature is raised in the curing stage. Such accelerators are very useful in processing rubber stocks containing carbon blacks, and are particularly valuable when furnace carbon blacks are used owing to the tendency of these to cause scorching.

Cyclohexyl benzthiazylsulphenamide can be obtained by oxidising cyclohexylamine and mercaptobenzthiazole (that is to say 2-mercaptobenzthiazole) or a salt of mercaptobenzthiazole in conjunction, using for instance an oxidising agent such as hydrogen peroxide, a hypochlorite (for example sodium hypochlorite), chlorine, potassium ferricyanide or potassium persulphate. A variety of methods of procedure are possible, and for instance a process described in British Patent No. 517,451 is to oxidise an aqueous solution of cyclohexylamine and the sodium salt of mercaptobenzthiazole by means of an oxidising agent, such as hydrogen peroxide. In British Patent No. 642,597 a process is described in which an aqeous solution of cyclohexylamine and the sodium salt of mercaptobenzthiazole is oxidised by the simultaneous addition of a hypochlorite and an acid such as sulphuric acid so as to maintain the reaction mixture at a substantially constant pH, and in British Patent No. 655,668 free mercaptobenzthiazole is used by suspending the mercaptobenzthiazole in water, adding excess cyclohexylamine, and then introducing the oxidising agent. A very convenient method of procedure is to form the cyclohexylamine salt of mercaptobenzthiazole (suitably by acidification of a solution containing cyclohexylamine and the sodium salt of mercaptobenzthiazole) and then to oxidise this amine salt. In all these processes the cyclohexyl benzthiazylsulphenamide is in effect obtained by oxidising cyclohexylamine and mercaptobenzthiazole, or for instance the sodium salt of mercaptobenzthiazole, in conjunction.

The quality of the cyclohexyl benzthiazylsulphenamide obtained depends largely on the oxidising agent which is used, and it has sometimes been considered that the best results are not obtained with a hypochlorite such as sodium hypochlorite. The quality can be assessed by means of the crystallising point of the material and the amount of impurities insoluble in ether which it contains. The crystallising point (which normally lies somewhere within the melting point range) is of course determined by melting a sample of the material, plotting temperature against time as the sample cools, and ascertaining where the cooling curve flattens. The higher the quality of the material the higher will be its crystallising point and the lower will be its content of ether-insoluble matter. The use of for instance sodium hypochlorite as the oxidising agent would be preferable on economic grounds if the quality of the cyclohexyl benzthiasulphenamide produced was satisfactory.

It has hitherto been believed that if the reaction is carried out using a hypochlorite such as sodium hypochlorite a low temperature of reaction is very desirable. Thus in British Patent No. 642,597 a temperature of 10–30° C. is mentioned, and it is indicated that a higher temperature is undesirable as above 30° C. the yield is reduced. In British Patent No. 655,668 a reaction temperature of 35° C. is referred to for the particular method of operation disclosed in that specification. The general impression has been that in order to avoid the formation of unwanted by-products the reaction temperature should be relatively low.

It has now been found on the contrary that if an alkali metal hypochlorite is used as the oxidising agent at a temperature in the range of 45° C. to 70° C. the results are in fact considerably superior. A product of improved quality is obtained, and the yield is very satisfactory. The explanation may well be that by-products which tend to persist at a lower temperature become decomposed at the higher temperature, but whether this is so or not a greatly improved overall result is obtained by operating at the higher temperature, when all the various factors are taken into consideration.

The process of the present invention is therefore one for the preparation of cyclohexyl benzthiazylsulphenamide in which cyclohexylamine and mercaptobenzthiazole are oxidised with an alkali metal hypochlorite at a temperature in the range of 45° to 70° C.

The cyclohexylamine and the mercaptobenzthiazole can be employed in the form of the cyclohexylamine salt of mercaptobenzthiazole, and it is often preferable to do this. Of course, the cyclohexylamine salt of mercaptobenzthiazole need not be formed as such before the oxidation is commenced, and the procedure may be adopted of starting with a mixture of cyclohexylamine and an inorganic salt of mercaptobenzthiazole, for instance the sodium or potassium salt, and then making a simultaneous addition of a non-oxidising acid, for instance sulphuric acid, with the alkali metal hypochlorite, the total amount of acid used being substantially equivalent to the salt of mercaptobenzthiazole.

The temperature range to be preferred is from 50° C. to 65° C., and the best results are often obtained using a reaction temperature of about 60° C.

The cyclohexylamine and the mercaptobenzthiazole can be brought into reaction with the alkali metal hypochlorite, for instance sodium or potassium hypochlorite, in any suitable manner. Preferably the cyclohexylamine is used in excess of the theoretical quantity required, and a small excess of about 10% cyclohexylamine is often satisfactory. Good results are obtained when the cyclohexylamine salt of mercaptobenzthiazole is formed as an initial operation and then oxidised subsequently with the alkali metal hypochlorite. This amine salt can if desired be formed from an aqueous mixture of cyclohexylamine and for instance the sodium or potassium salt of mercaptobenzthiazole by adding a non-oxidising acid such as sulphuric acid in an amount sufficient to liberate the mercaptobenzthiazole from its sodium or potassium salt. In practice the resultant mixture will then have a pH value on the alkaline side owing to the presence of an excess of cyclohexylamine. The cyclohexylamine salt of mercaptobenzthiazole is partially soluble in water, but under such conditions most of it is precipitated in the form of a slurry if the presence of too much water is avoided. Alternatively the cyclohexylamine salt of mercaptobenzthiazole can be formed directly from cyclohexylamine and mercaptobenzthiazole, for example by heating these two materials together in water.

A suitable method of carrying out the process is described in the examples given below.

The oxidation step is preferably carried out using sodium hypochlorite, and aqueous solutions containing say 7–15% by weight of sodium hypochlorite and perhaps 0.6–0.9% by weight of sodium hydroxide can suitably be used. Such solutions can be obtained by chlorinating solutions of sodium hydroxide. The most efficient method of procedure is to add the sodium hypochlorite solution slowly with stirring and to follow the course of the reaction by continuously measuring the pH value using an antimony electrode in conjunction with a saturated calomel half cell; when the reaction is complete the indicated pH value falls sharply, showing that the addition of hypochlorite should be stopped. It is usually found that at this point a considerable excess of hypochlorite has been added relative to the amount of mercaptobenzthiazole used. The cyclohexyl benzthiazylsulphenamide thereby formed can then be filtered off, washed and dried.

If desired the cyclohexyl benzthiazylsulphenamide can be treated in an aqueous medium with an alkali such as sodium hydroxide in order to remove part at least of any dibenzthiazyl disulphide which is formed as a by-product, and also to remove any unreacted mercaptobenzthiazole. Such a treatment is preferably carried out at about the temperature of the oxidation step, and the use of a 10% aqueous solution of sodium hydroxide in an amount one fifth of the molecular equivalent of the original amount of mercaptobenzthiazole or its salt is appropriate.

In a series of tests carried out for purposes of comparison the following average results were obtained by oxidising the cyclohexylamine salt of mercaptobenzthiazole with sodium hypochlorite at various temperatures in the manner described above, the final slurry being given the same treatment with an aqueous solution of sodium hydroxide. In each instance the crystallising point of the cyclohexyl benzthiazylsulphenamide and the content of impurities insoluble in ether are given:

| Reaction temperature, ° C. | Crystallising point, ° C. | Percent ether-insoluble impurities |
| --- | --- | --- |
| 35 | 97.2 | 0.5 |
| 50 | 99.7 | 0.1 |
| 60 | 100.2 | 0.05 |

The results in Examples 2 and 3 below approximate to the average values given above for reaction temperatures of 50° C. and 60° C. respectively, although they are in fact actually superior to these average values.

The invention is illustrated by the following examples:

*Example 1*

The example illustrates the preparation of cyclohexyl benzthiazylsulphenamide by a process in which the cyclohexyl amine salt of mercaptobenzthiazole is oxidised by sodium hypochlorite at a temperature of 48–50° C.

There were introduced into a 3-necked flask of 1 litre capacity 155 cc. of an aqueous solution of the sodium salt of mercaptobenzthiazole containing the equivalent of 41.8 grams (0.25 mol.) of mercaptobenzthiazole, 27.5 grams (0.275 mol.) of cyclohexylamine and 100 cc. of water. The flask was one equipped with an internal glass well in which a thermometer was placed, and a reflux condenser, stirrer and dropping funnel were fitted into the central neck of the flask. A saturated calomel half cell and an antimony electrode were inserted through the other two necks of the flask respectively, and these were connected to a pH meter.

The flask was heated in a water bath to a temperature of 40° C., and 61.3 grams of 20% sulphuric acid were added slowly by means of the dropping funnel over a period of 15 minutes, during which time the temperature rose to 48° C. and the cyclohexylamine salt of mercaptobenzthiazole was precipitated to form a thick slurry. 40 cc. of water were then added so that the slurry could be more easily stirred, and at this stage the reading on the pH meter was 10.4.

An aqueous solution containing 14.0% by weight of sodium hypochlorite and 0.9% by weight of sodium hydroxide was then added drop by drop to the well stirred slurry maintained at a temperature of 48–50° C. After an initial slight drop the pH value rose gradually to 11.1 and then fell sharply to 10.9, indicating the end of the reaction. The addition of the hypochlorite solution was then stopped. It was found that 175 grams of the solution had been added over a period of 62 minutes, equivalent to 0.33 mol. of sodium hypochlorite. The resultant slurry was stirred for a further period of 10 minutes at a temperature of 45–50° C. and then cooled to 25° C. The product was filtered off, washed free from chloride and sulphate ions with water, and dried for 16 hours at 50° C.

A yield of 61.6 grams of cyclohexyl benzthiazylsulphenamide was obtained, this being 93.3% of the theoretical value calculated on the mercaptobenzthiazole. It had a crystallising point of 99.6° C. and contained 0.1% of matter insoluble in ether.

*Example 2*

This example describes a process in which a temperature of 49.5–51° C. is used and the product is washed with sodium hydroxide solution.

Using the same apparatus as described in Example 1, there were introduced into the flask 153.5 cc. of an aqueous solution of the sodium salt of mercaptobenzthiazole containing the equivalent of 41.8 grams of mercaptobenzthiazole, 27.5 grams of cyclohexylamine and 100 cc. of water. The flask was heated to 40° C. in a water bath, and 61.3 grams of 20% sulphuric acid were added as before. The cyclohexylamine salt of mercaptobenzthiazole was thus precipitated to form a slurry, after which 40 cc. of water were added and the mixture was heated to 49.5° C. The pH value at this point was found to be 10.2.

An aqueous solution containing 15.0% by weight of sodium hypochlorite and 0.85% by weight of sodium hydroxide was then added drop by drop to the well stirred slurry maintained at a temperature of 49.5–51° C. The pH value first fell slightly and then rose to 10.6, at first slowly and then more quickly, after which it fell sharply. The addition of hypochlorite solution was then stopped, 173 grams of the solution having been added over a period of 45 minutes. A solution of 2 grams of sodium hydroxide in 20 cc. of water was then added to wash the product, and the slurry was stirred for 10 minutes at 50–52° C. and then cooled to room temperature. The product was filtered off, washed free from chloride and sulphate ions with water, and dried for 16 hours at 55–60° C.

A yield of 62.6 grams of cyclohexyl benzthiazylsulphenamide was obtained, this being 94.6% of the theoretical value calculated on the mercaptobenzthiazole. It had a crystallising point of 100.5° C. and contained 0.1% of matter insoluble in ether.

*Example 3*

This example describes a process in which a temperature of 59.5–61° C. is used and the product is washed with sodium hydroxide solution.

Using the same apparatus as described in Example 1, there were introduced into the flask 153.5 cc. of an aqueous solution of the sodium salt of mercaptobenzthiazole containing the equivalent of 41.8 grams of mercaptobenzthiazole, 27.5 grams of cyclohexylamine and 100 cc. of water. The flask was heated to 55° C. in a water bath, and 61.3 grams of 20% sulphuric acid were added as before. The temperature rose to 60° C., and the cyclohexylamine salt of mercaptobenzthiazole was precipitated to form a slurry. 40 cc. of water were added as before, and the pH value was then found to be 10.5.

An aqueous solution containing 15.05% by weight of sodium hypochlorite and 0.85% by weight of sodium hydroxide was then added drop by drop to the well stirred slurry maintained at a temperature of 59.5–61° C. The pH value first fell slightly to 10.2 and then rose gradually to 10.5 after which it fell sharply to 10.2. The addition of the hypochlorite solution was then stopped, 176 grams of the solution having been added over a period of 45 minutes. A solution of 2 grams of sodium hydroxide in 20 cc. of water was then added to wash the product, and the slurry was stirred for 20 minutes at 60–62° C. and then cooled to 25° C. The product was filtered off, washed free from chloride and sulphate ions with water, and dried for 16 hours at 60° C.

A yield of 61.9 grams of cyclohexyl benzthiazylsulphenamide was obtained, this being 93.7% of the theoretical value calculated on the mercaptobenzthiazole. It had a crystallizing point of 101° C. and a melting point of 100.5–103° C. and contained virtually no impurities insoluble in ether.

What is claimed is:

A process for the preparation of cyclohexyl benzthiazylsulphenamide, which comprises admixing an aqueous solution of an alkali metal salt of mercaptobenzthiazole and an excess of the theoretical quantity of cyclohexylamine, adding an acid to said solution to form a slurry of the cyclohexylamine salt of mercaptobenzthiazole and oxidizing said cyclohexylamine salt of mercaptobenzthiazole with an alkali metal hypochlorite at a temperature in the range of 50° to 65° C.

References Cited in the file of this patent

UNITED STATES PATENTS

| | | |
|---|---|---|
| 2,045,888 | Tschunkur et al. | June 30, 1936 |
| 2,191,657 | Harman | Feb. 27, 1940 |
| 2,339,002 | Cooper | Jan. 11, 1944 |
| 2,419,283 | Paul et al. | Apr. 22, 1947 |

FOREIGN PATENTS

| | | |
|---|---|---|
| 185,343 | Switzerland | Oct. 1, 1936 |
| 519,617 | Great Britain | Apr. 2, 1940 |